United States Patent
Hougham et al.

[11] Patent Number: 5,847,860
[45] Date of Patent: Dec. 8, 1998

[54] HIGH DENSITY ELECTROCHROMIC DISPLAY

[75] Inventors: Gareth Geoffrey Hougham, Ossining, N.Y.; Anthony Cyril Lowe, Braishfield, United Kingdom

[73] Assignee: International Business Machines Corporation, Armonk, N.Y.

[21] Appl. No.: 684,767

[22] Filed: Jul. 17, 1996

[51] Int. Cl.[6] .................................................. G02F 1/153
[52] U.S. Cl. .......................................... 359/267; 359/274
[58] Field of Search .................................... 359/267, 274, 359/270

[56] References Cited

U.S. PATENT DOCUMENTS

| | | | |
|---|---|---|---|
| 3,844,636 | 10/1974 | Maricle | 350/160 |
| 4,354,741 | 10/1982 | Mano et al. | 350/357 |
| 4,598,979 | 7/1986 | Sugiuchi et al. | 350/357 |
| 5,056,899 | 10/1991 | Warszawski | 359/265 |
| 5,069,535 | 12/1991 | Baucke et al. | 359/273 |
| 5,078,480 | 1/1992 | Warszawski | 359/265 |
| 5,253,100 | 10/1993 | Yang et al. | 359/266 |

*Primary Examiner*—Georgia Y. Epps
*Assistant Examiner*—Dawn-Marie Bey
*Attorney, Agent, or Firm*—Scully, Scott, Murphy & Presser

[57] ABSTRACT

An electrochromic display and a method for making thereof are disclosed. The display has isolated and perforated reflectors separating an electrolyte confined between two electrodes. The front electrode is transparent. The reflector eliminates the need to include pigment particles in the electrolyte to mask the black rear electrode and to provide a desired color background. The pigment free electrolyte is thinner than a pigmented electrolyte. The reflector reflects light back to the transparent electrode thus masking the rear electrode and providing a background color other than black. When the rear electrode is driven by a drive circuit, ions of the electrolyte and current pass through the reflector towards the front electrode, where a coloration reaction occurs to form an image. The electrochromic display is thin, has high resolution, and does not exhibit image spreading and distortion.

12 Claims, 8 Drawing Sheets

HIGH DENSITY ELECTROCHROMIC DISPLAY

BACKGROUND OF THE INVENTION

1. Field of the Invention

The present invention is directed to an electrochromic display, and more particularly, to a high density electrochromic display that has an electrically isolated, ion permeable reflector located in an electrolyte material between two electrodes.

2. Discussion of the Prior Art

Electro-optical devices have been used in display devices. Portable display devices, e.g., used in battery operated portable computers, require low control voltages and low power consumption. In addition, such display devices must be thin and often have flat screens. Various light-modulating techniques, involving for example electrochromic, electrophoretic and liquid crystal technologies, have been used to form images on flat screens, which are also known as flat panel displays.

Image forming by electrochromic processes uses the reversible change of color and/or of optical density obtained by electro-chemical oxidoreduction of electrochromic material. Oxidized and reduced forms of electrochromic material have different colors and/or optical densities.

Displays using electrochromic light-modulating processes have many desirable characteristics, namely, low operating voltage, high contrast at all viewing angles, and temporal stability of the image. This latter property results in low power consumption since the image, once written, does not need to be refreshed unless it is changed. This is not the case, e.g., for most liquid crystal displays.

FIG. 1a shows a prior art electrochromic (EC) pixel-sized cell or display 10 based on reversible deposition of bismuth (Bi). The rear of the EC device 10 has a glass or plastic substrate 12 onto which an array of electrically conductive counter-electrode stripes 14 is formed. A typical counter-electrode 14 is a black carbon paste counter-electrode.

A gel electrolyte 16 is deposited over the counter-electrode 14. The gel electrolyte 16 is formed by dispersing pigment particles in an electrolytic material. A white pigment, such as titanium dioxide ($TiO_2$) particles, suspended in the gel electrolyte 16, masks the counter-electrode 14 from a viewer 15 and provides a white background. Color pigments, alone or mixed with a white pigment, may also be used to obtain a desired color background.

An array of front working electrode stripes 17 is formed on the inner surface of a front substrate 19 of the display 10, opposite, and in a direction orthogonal to, the counter-electrode stripes 14. Typically, the front substrate 19 is made of glass. A picture element, or pixel, of the display 10 is formed in the area of overlap between one working electrode stripe 17 and a counter electrode stripe 14. An image formed on the front electrode 17 is observable by the viewer 15. The front electrode 17, in addition to being electrically conductive, is also optically transparent. Typically, the front electrode 17 is made of mixed oxides of tins and indium, often referred to as an ITO electrode.

The pixel sized cell 10 is "written" and "erased" by varying a voltage potential across the two electrodes 14, 17. If the potential of the ITO electrode 17 is made suitably anodic with respect to the counter electrode 14, any Bismuth (Bi) deposit on the ITO electrode 17 is oxidized to the colorless bismuth cation according to equation (1) (dashed arrow). In this case, the display 10 is referred to as being in the OFF or erased state, and appears white because of the white $TiO_2$ pigment in the electrolyte 16.

The ON or written state is achieved by applying a voltage potential such that the ITO electrode 17 becomes suitably cathodic with respect to the counter electrode 14 to cause the reduction of bismuth cations to the metal according to equation (1) (solid arrow), resulting in a black appearance. The applied voltage causes a coloration reaction on the ITO electrode 17 according to equation (1):

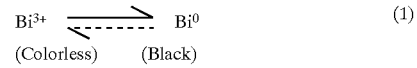

$$Bi^{3+} \rightleftharpoons Bi^0 \quad (1)$$
(Colorless) (Black)

In addition, a counter electrode reaction according to equation (2) takes place on the carbon paste counter electrode 14, where Br denotes Bromine.

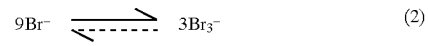

$$9Br^- \rightleftharpoons 3Br_3^- \quad (2)$$

The counter electrode reaction (2) produces a colorless to brown color change. The coloration reaction at the counter electrode 18 is reversed when the display 10 is erased (equation(2) dashed arrow), i.e., when the counter electrode 14 is made cathodic with respect to the ITO electrode 17.

Such a cell 10 is adequate for displays having large pixels. Because of the thickness of the pigment loaded gel electrolyte 16, the size of cell 10 cannot be reduced for use in thin displays with small sized pixels. Thus, a major disadvantage of the cell 10 is the relatively large thickness of the $TiO_2$-loaded electrolyte 16. This thickness must be of the order of a few hundred microns in the prior art, in order to obtain adequate back-scatter of incident light from the $TiO_2$-loaded electrolyte 16.

The thick size of the cell 10 prevents its use in high definition displays having a high density of small pixels. The cell 10, having a thickness of a few hundred microns, cannot be used for displays where the pixel dimension is less than the thickness of the electrolyte 16 in the cell 10.

Another disadvantage of the thick conventional cell 10 is image distortion. This is due to the spreading of current passing between a working ITO electrode stripe 17 and a counter electrode stripe 14 to regions outside their area of overlap. Therefore, the current spread produces an image on the ITO electrode 17 which is larger than the required image. This results in loss of resolution.

In another example of the prior art, which applies particularly to high pixel content displays, the arrangement of the electrodes 14, 17 is changed. Referring now to FIG. 1b, the rear substrate 12 of a cell 10' is processed with a rectilinear array of transistor or diode switches. The counter electrode 14 is processed into a array of discrete areas, one pixel in dimension, each isolated from the others and each electrically connected to one switch. A working ITO electrode 18 is formed as a continuous sheet. This arrangement avoids some of the problems associated with extending the first example of the prior art (FIG. 1a) to large pixel content, but it does not remove the problem of image spreading.

SUMMARY OF THE INVENTION

The object of the present invention is to provide an electrochromic cell or display that eliminates the problems of prior art displays.

Another object of the present invention is to reduce the thickness of a cell, while retaining desirable characteristics of electrochromic displays.

A further object of the present invention is to reduce current and image spreading from a rear electrode to a front electrode of the cell.

Yet another object of the present invention is to reduce loss of resolution.

The present invention accomplishes these and other objects by omitting pigments, such as titanium dioxide ($TiO_2$), from the electrolyte formulation of the display. This reduces the thickness of the cell, thus preventing image spreading. One embodiment of the inventive display comprises an electrode and a counter electrode. The electrode is substantially transparent and the counter electrode is spaced transversely and separated from the transparent electrode. A reflector and an electrolyte are provided between the two electrodes. The reflector is electrically isolated and ion permeable. The reflector may be metallic or a dielectric stack and is ion permeable due to voids formed under tensile stress or by etching.

In another embodiment, a second reflector having voids is provided between the two electrodes. The voids of the two reflectors are offset relative to each other so that reflectivity is increased. In a further embodiment, an optional diffuser is provided over the front electrode. Illustratively, the diffuser is a holographic diffuser.

In yet another embodiment of the present invention, a method for forming the display is provided comprising the following steps:

(a) forming a counter electrode on a rear display;
(b) forming a first layer of electrolyte on the counter electrode;
(c) forming a reflector on the electrolyte;
(d) forming a second layer of electrolyte which stresses the reflector to form voids therein; and
(e) forming a front electrode on the second layer of electrolyte.

Other embodiments may include one of the following additional steps:

forming a diffuser over the front electrode, after step (e);
dehydrating the first layer of electrolyte, after step (b); or
etching holes through the reflector, after step (d).

Another embodiment includes the following steps, which are performed after step (d):

forming a second reflector over the second layer of electrolyte;
forming voids in the second reflector, the second reflector voids being offset from the first reflector voids; and
forming a third layer of electrolyte over the second reflector.

Yet another embodiment includes the following steps, which are also performed after step (d):

forming a mask over the reflector;
patterning the mask to expose portions of the reflector;
etching the exposed portions of the reflector to form holes therein; and
removing the patterned mask.

In yet another embodiment of the present invention, electrically insulating barriers are formed vertically in the inter-pixel gaps between the reflector and the working electrode. By providing a physical barrier to the passage of current outside the desired pixel area, this further reduces image spreading.

DETAILED DESCRIPTION OF THE INVENTION

Figure 2A:
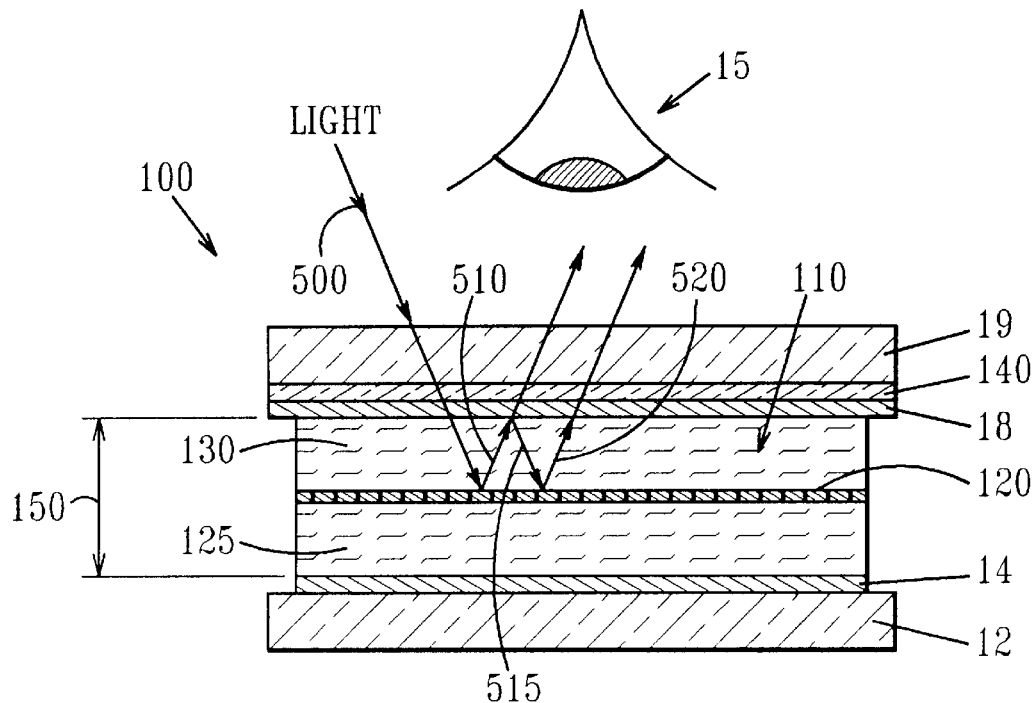
FIG. 2a shows a cross section of an electrochromic cell according to the present invention.

FIG. 2a shows a cross section of an electrochromic cell or display 100 according to one embodiment of the present invention. The display cell 100 may be a single pixel of an image. Elements common in the figures are identically referenced. The display 100 has a rear counter electrode 14 which may be a black carbon paste counter electrode having, for example, a thickness of approximately 20 microns. The counter electrode 14 is formed over a substrate 12. The substrate 12 may be a silicon (Si) substrate and has a drive circuit (not shown) to activate the display 100. Illustratively, the drive circuit includes a thin film transistor (TFT).

An electrolyte 110, that has ions for electrical conduction, is confined between the counter electrode 14 at the rear of the display 100, and a front electrode 18 (located at the front or top of the display 100). Illustratively, the electrolyte 110 is Lithium Bromide (LiBr).

The front electrode 18 may be formed using a thin layer of a transparent oxide or a metal, with a thickness appropriate to meet the required transparency and conductive properties. Illustratively, the front electrode 18 is an ITO electrode or a substrate coated with ITO. The front ITO electrode 18 is located between a front substrate 19 and the electrolyte 110. Images are formed on the ITO electrode 18 to be observed by a viewer 15.

Figure 2B:
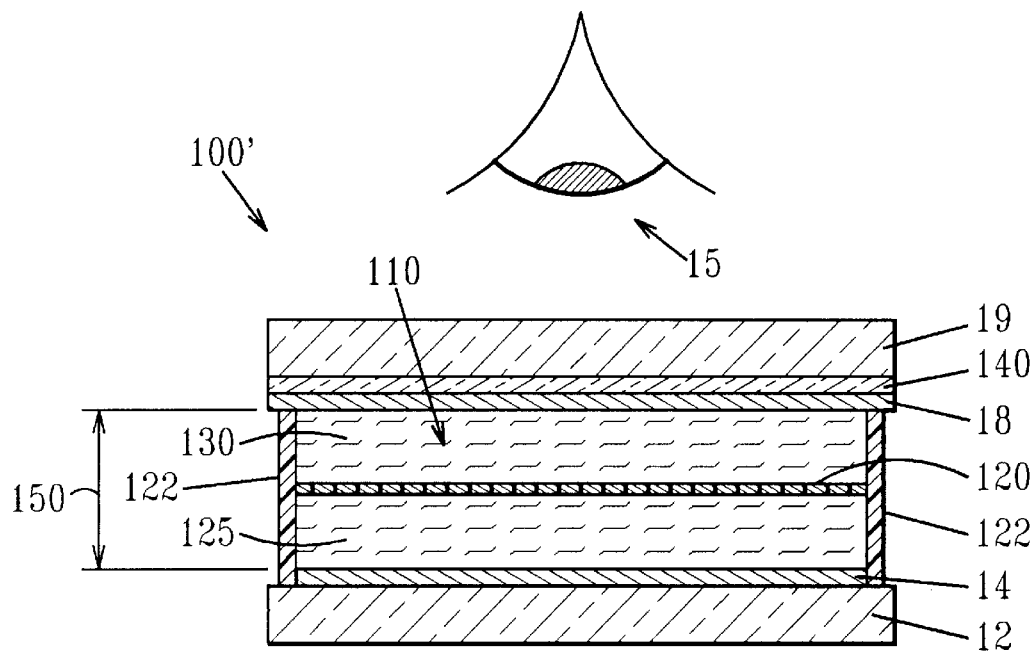
FIG. 2b shows a cross section of a cell having inter-pixel isolation barriers.

The electrolyte 110 can also be confined at its sides, by inter-pixel isolation barriers 122, shown in FIG. 2b, that separate and isolate (both mechanically and electrically) electrolytes of contiguous cells. Illustratively, the inter-pixel isolation barriers 122 are a photolithographically defined polymer.

Figure 1A:
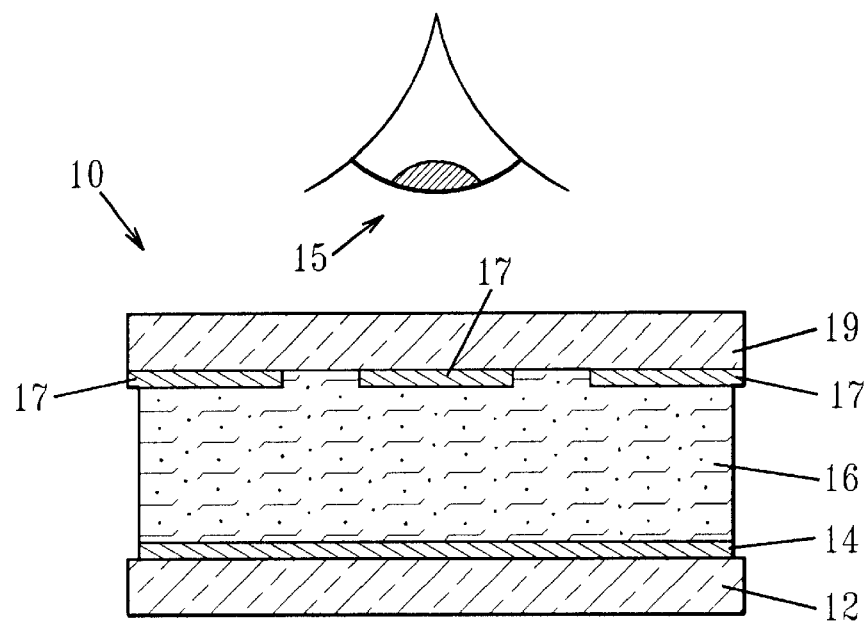
FIG. 1a shows a cross section of a conventional electrochromic cell.
Figure 1B:
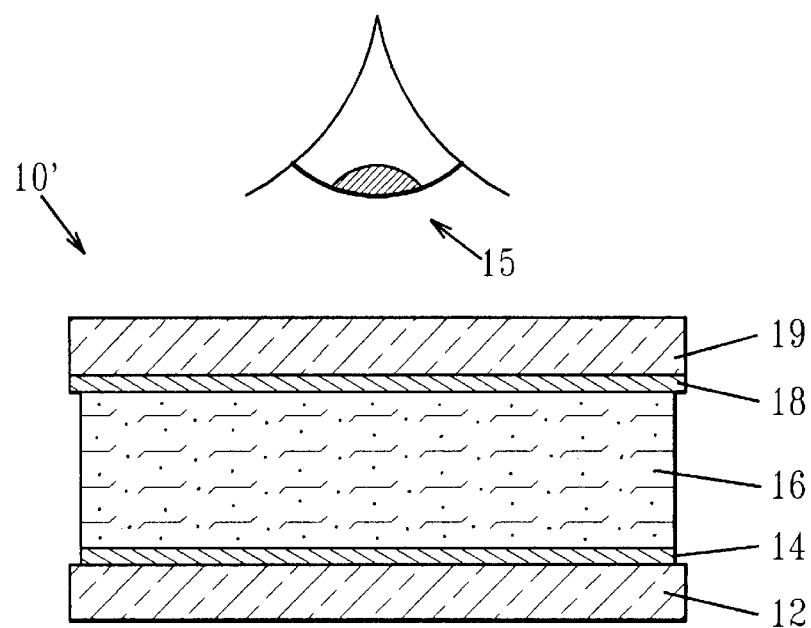
FIG. 1b shows a cross section of another conventional electrochromic cell.

Unlike the electrolyte 16 of FIG. 1, the electrolyte 110 does not include pigment particles, such as the titanium dioxide ($TiO_2$) particles. Using a pigment free electrolyte allows reduction of its thickness without deleterious effects to images formed on the ITO electrode 18.

A reflector 120 is used, instead of pigments, to mask the black counter electrode 14 and provide a desired color background. The reflector 120 is surrounded by the electrolyte 110, separating the electrolyte 110 into rear and front regions 125, 130, respectively. The reflector 120 is electrically isolated and ion permeable. For example, the reflector 120 is perforated. The perforations allow ions to pass between the rear and front electrolytic regions 125, 130. The ion flow causes current flow between the two electrodes 14, 18.

Illustratively, the isolated and perforated reflector 120 is a mirror made from metal or a dielectric stack. Dielectric stacks are well known in the art and use alternating dielectric layers to reflect light in a desired wavelength range. The alternating dielectric layers have unequal refraction indices to reflect light. The thickness of the alternating dielectric layers is $\lambda/4$, where $\lambda$ is the wavelength of light to be reflected so that a particular background color is achieved.

An optical diffuser 140 may be positioned over the ITO electrode 18, between the ITO electrode 18 and the front substrate 19 which faces a viewer 15. Illustratively, the diffuser 140 is a holographic diffuser.

Despite using the reflector 120, the thickness of the inventive display 100 is substantially less than the thickness of conventional displays using pigment loaded electrolytes. This reduced thickness is due to reduction in the thickness of the pigment free electrolyte 110. Illustratively, the thickness 150 between the two electrodes 14, 18 is approximately in the range of 50 microns to 100 microns; where the thickness of the rear or front electrolytic regions 125, 130 is approximately less than 25 microns to 50 microns each, and the thickness of the reflector 120 is approximately less than 0.2 microns to 3 microns.

The reduced thickness of the electrolyte 110, in combination with the reflector 120, does not cause spreading and distortion of images formed on the ITO electrode 18. The small size and thickness of the cell 100 allows formation of thin high resolution displays. An array of the thin cells 100 forms very thin high resolution displays, having small pixels and high pixel density. Illustratively, a pixel size of preferably less than 100 microns and a pixel density of $10,000/cm^2$ are achieved.

The cell 100 may represent a single pixel of an image, which is formed by an array of pixels. Thus, an image is formed on a display having an array of the cells 100. The image is formed on the ITO electrode 18. Illustratively, the ITO electrode 18 is common to the array of displays 100, as shown in FIG. 3.

Figure 3:
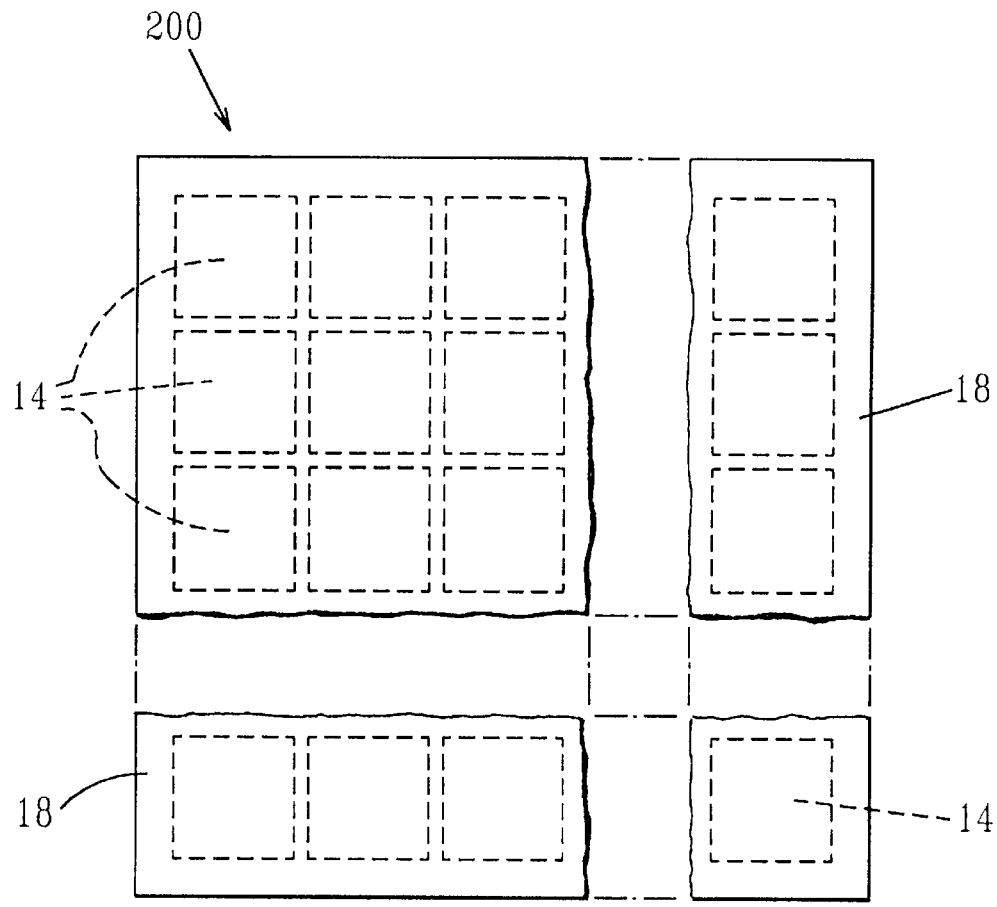
FIG. 3 is a top view of a display array according to the present invention.
Figure 4:
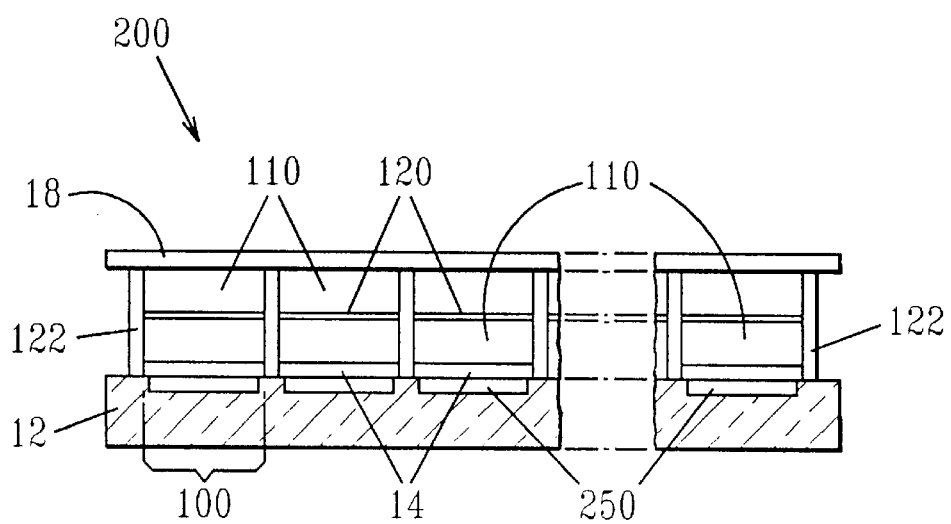
FIG. 4 is a cross section of the display array shown in FIG. 3 according to the present invention.

FIG. 3 is a top view of a display array 200 that uses a common ITO electrode 18, and individually driven counter electrodes 14 located below the common ITO electrode 18. FIG. 4 is a cross section of the display array 200, showing the substrate 12 having individual TFT driver 250 associated with individual counter electrodes 14 of contiguous cells 100.

FIG. 4 shows contiguous cells 100 arranged in an array which is associated with the image pixel array. As described in connection with FIG. 2a, each display cell 100 is separated from contiguous displays by interpixel isolation barriers 122. The inter-pixel isolation barriers 122 isolate and confine the electrolyte 110 of each cell 100 between an individual counter electrode 14 and the common ITO electrode 18. The reflector 120 of each cell 100 is shown located within the electrolyte 110.

Figure 5:
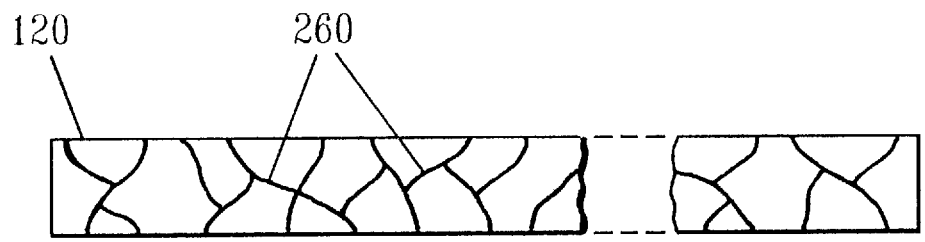
FIG. 5 shows one embodiment of a reflector according to the present invention.
Figure 6:
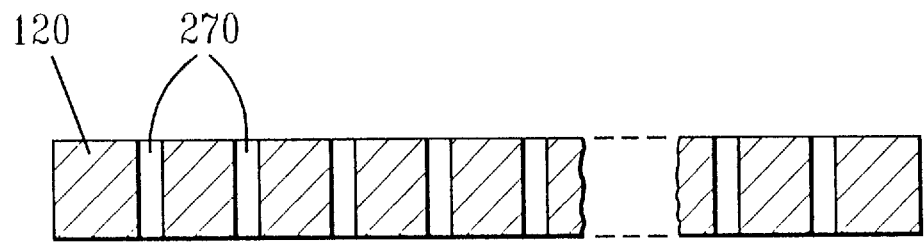
FIG. 6 shows another embodiment of a reflector according to the present invention.

FIG. 5 shows one embodiment of the reflector 120 which is ion permeable due to cracks 260 therein. FIG. 6 shows another embodiment of the reflector 120, where nearly vertical vias or holes 270 extend across the reflector 120.

Figure 7:
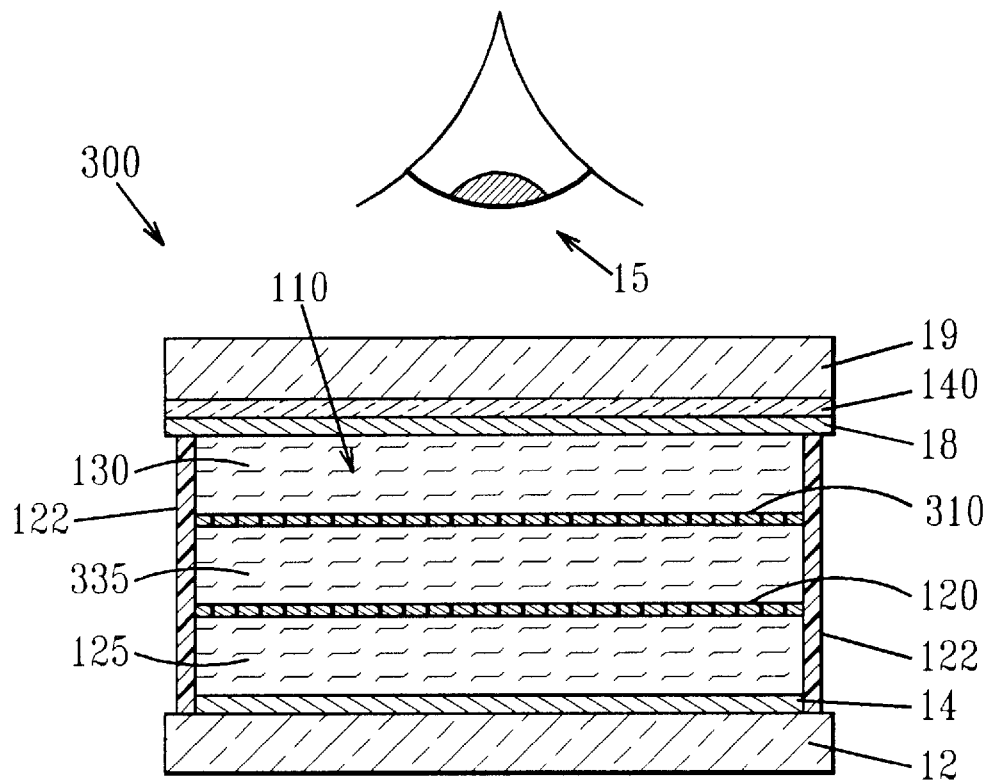
FIG. 7 shows a cross section of another embodiment of a display according to the present invention.

Instead of using a single reflector 120, two reflectors may be used where the vias of one reflector are offset from vias of the other reflector. FIG. 7 shows a cell 300 where two reflectors 120, 310 separate the electrolyte 110 into three regions; rear, intermediate and front electrolytic regions 125, 335, 130, respectively.

Figure 8:
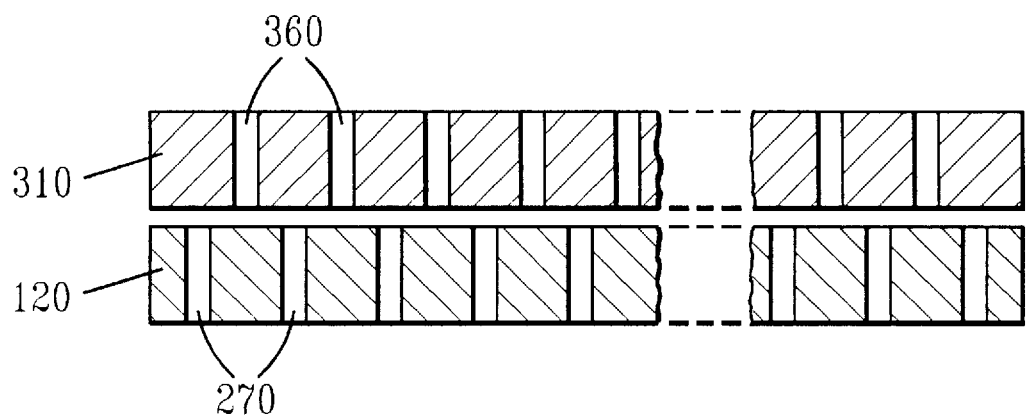
FIG. 8 shows two reflectors according to an embodiment of the present invention.

FIG. 8 shows the two reflectors 120, 310 which are arranged to maximize reflectivity. As shown in FIG. 8, reflectivity is maximized by locating vias 270 of the rear reflector 120 between the vias 360 of the front reflector 310, so that there is substantially no overlap between the vias 270, 360 of the two reflectors 120, 310.

The operation of the display or cell 100 of FIG. 2a will now be explained. In the off-state, where the counter electrode 14 is made cathodic with respect to the working ITO electrode 18, incident light 500 is transmitted towards the counter electrode 14 by the transparent front ITO electrode 18; is reflected 510 by the reflector 120; and is again transmitted 515 toward the counter electrode 14 by the ITO electrode 18. The reflector 120 may provide sufficient scattering of the light incident 500, 515 thereon so that the display 100 has the required diffuse reflectivity property. In this case, the light rays, 500, 515 incident on the reflector 120 reflect therefrom as reflected lights 510, 520, and are substantially diffused. However, in the case when the reflector 120 is substantially a specular, or mirror-like reflector, the diffuser 140 diffuses the incident lights 500, 515 and the lights 510, 520 reflected by the reflector 120, so that the overall reflection property of the display is substantially diffuse.

To switch the pixel to the on-state, the counter electrode 14 is driven by a driver, e.g., a thin film transistor (TFT), to a potential sufficiently anodic with respect to the working ITO electrode 18 that redox reactions take place on the working ITO electrode 18 and counter electrode 14 according to the direction of the solid arrows in equations (1) and (2) respectively, and bismuth ions are reduced to bismuth metal at the working electrode 18. This produces an image on the ITO electrode 18. Because the thickness of the electrolyte 110 is thin, current passing through the electrolyte 110, from the counter electrode 14 to the ITO electrode 18, will not spread. Thus, image distortion is substantially eliminated.

Figure 9A:
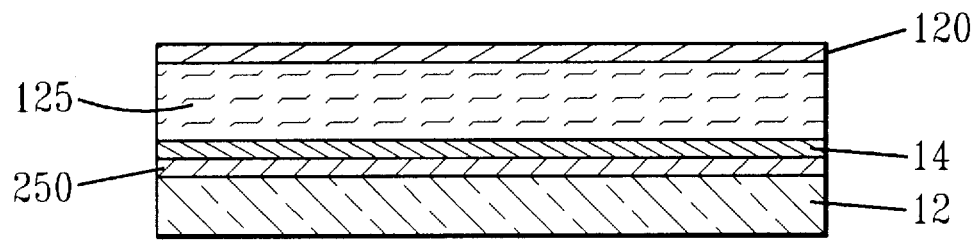
FIGS. 9a–9b show a method for forming a display according to the present invention.
Figure 9B:
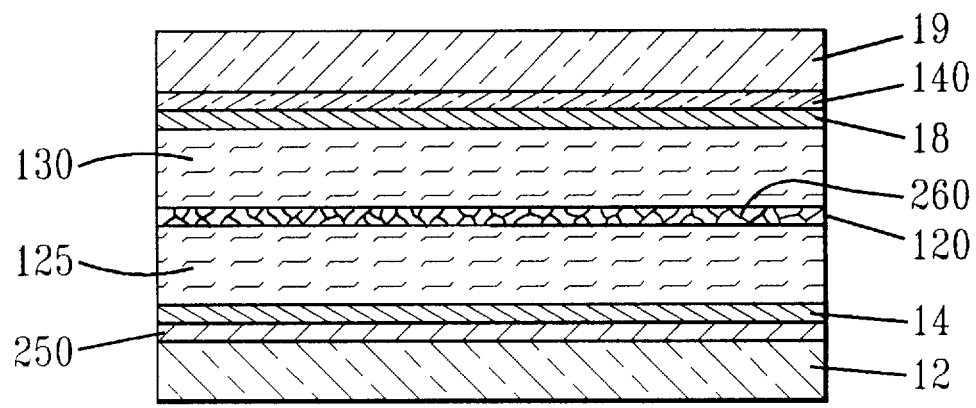

Another embodiment of the present invention is a method for forming the cell 100 of FIG. 2a. Of course, this method is equally applicable for forming an array of cells 100 to result in the display 200 of FIG. 3. As shown in FIGS. 9a–9b, the method for forming the cell 100 comprises the following steps:

(1) As shown in FIG. 9a, forming a driver 250, such as a TFT, on a substrate 12.

(2) Forming a counter electrode 14, such as a carbon electrode, on the driver 250. Each carbon electrode 14 is controlled individually by its own driver 250, as discussed in connection with FIG. 4.

(3) Forming a thin layer of electrolyte 125 on the counter electrode 14. Illustratively, the electrolyte layer 125 is screen printed.

(4) Processing the electrolyte layer 125 to remove substantially all water therefrom.

(5) Forming a thin reflector 120, such as a metal layer or a dielectric stack, on the dehydrated electrolyte layer 125. Illustratively, the reflective metal layer 120 is vacuum deposited. The reflector 120 has high reflectivity and is stable against chemical attack from the constituents of the electrolyte formulation. The reflector 120 is electrically isolated, thus it will not be subjected to electrochemical attack. The deposition conditions of the reflector 120 can be chosen to ensure that the reflector has some incidence of pinholes or stress cracks 260 there through to render it ion-permeable.

(6) As shown in FIG. 9b, forming a second electrolyte layer 130 on the metal (or dielectric stack) reflector 120. water from the second electrolyte layer 130 penetrates the metal pinholes and swells the underlying electrolyte layer 125. This places the reflector 120 under tensile stress which further leads to cracks 260 therethrough. The cracks 260 reduce the reflectivity of the reflector 120. However, the reflectivity remains sufficiently high to meet the display reflectivity requirements. Illustratively, the cracked reflective layer 120 has a reflectivity of at least 80%. The cracks 260 are an important feature of this invention since they provide a current path from the nearly obscured counter electrode 14 (masked by the reflector 120) to ITO electrode 18.

(7) Forming a top electrode 18 over the second electrolyte layer 130. Illustratively, the top electrode 14 is a transparent ITO electrode. The ITO electrode 14 is forced under pressure into intimate electrical contact with the second electrolyte layer 130.

(8) Forming an optical diffuser 140, such as a holographic diffuser, between the front substrate 19 and the ITO electrode 18 to achieve the required diffusing properties of the display.

Another method for forming the display uses photolithographic steps to define and etch holes through the reflective layer 120, instead of relying on the tensile fissure of the reflective layer 120. Although etching holes requires additional processing steps, etching is more precise and controllable.

Figure 10A:
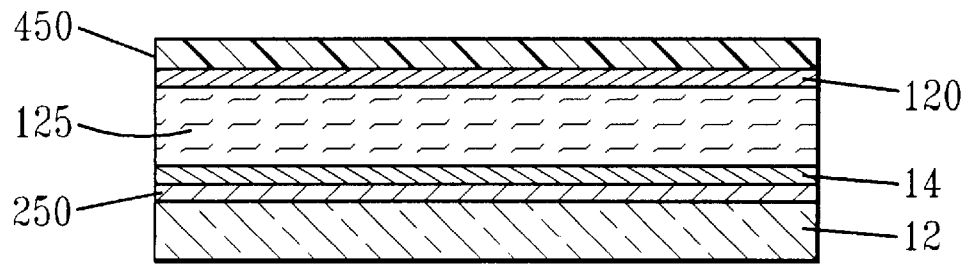
FIGS. 10a–10c show another method for forming a display according to the present invention.
Figure 10B:
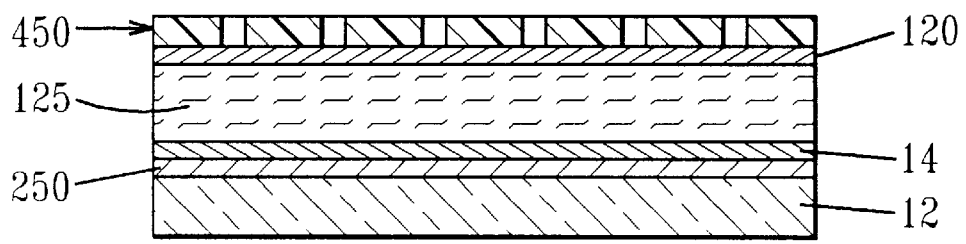
Figure 10C:
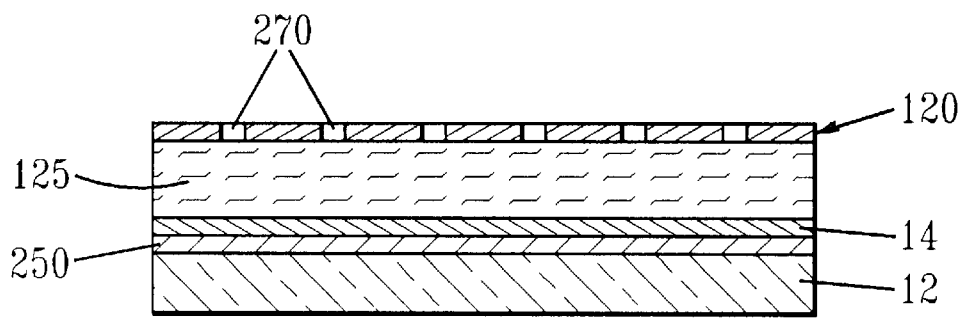

The photo-lithographic steps are performed after steps (1)–(5) described in connection with FIG. 9a. After step (5), the following steps are performed, as shown in FIGS. 10a–10c:

(5a) forming a mask 450 over the reflective layer 120, as shown in FIG. 10a;

(5b) patterning the mask 450, as shown in FIG. 10b;

(5c) etching through the patterned mask to form holes 270 through the reflective layer 120; and (5d) removing the patterned mask 450, as shown in FIG. 10c.

Once the holes 270 are formed through the reflective layer 120, steps (6)–(8), described in connection with FIG. 9b, are performed to complete the display fabrication process.

Figure 11A:
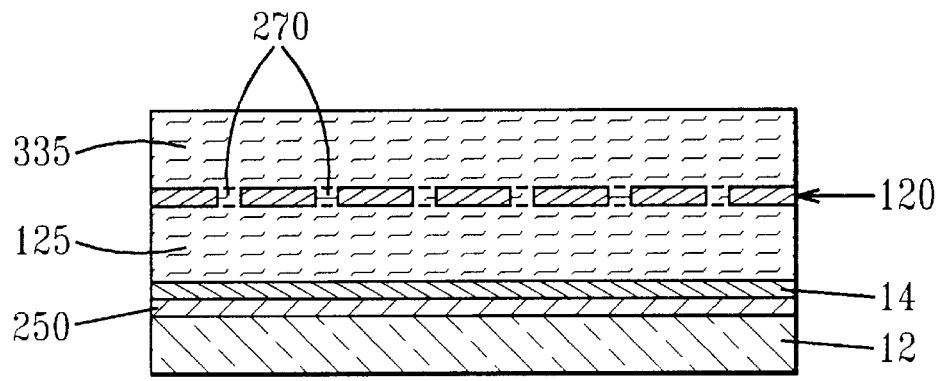
FIGS. 11a–11c show yet another method for forming a display according to the present invention.
Figure 11B:
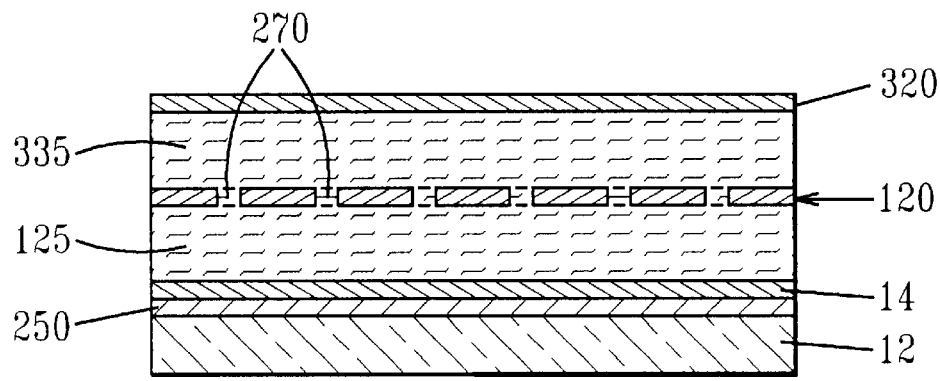
Figure 11C:
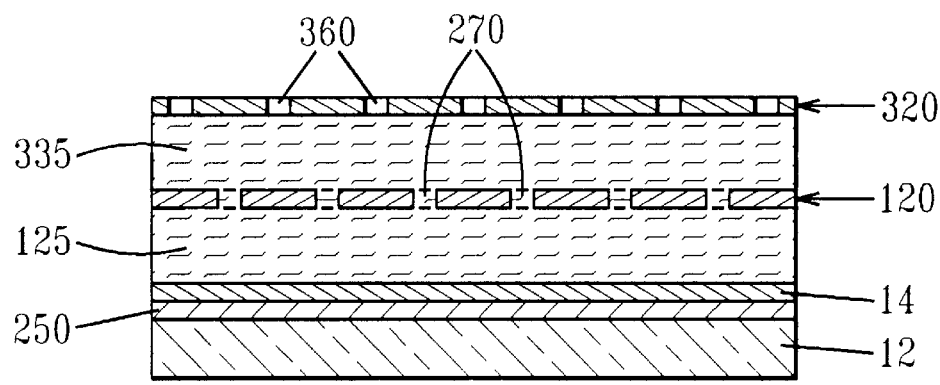

Yet another embodiment is a method for forming a display where two reflective metal layers are used to increase reflectivity. Holes are formed in each metal layer using photo-lithographic steps similar to steps (5a)–(5d), described in connection with FIGS. 10a–10c. To maximize reflectivity, holes of one metal layer are situated between holes of the other metal layer. An electrolyte separates the two metal layers. This method comprises steps (1)–(5) described in connection with FIGS. 9a–9b, and steps (5a)–(5d) described in connection with FIGS. 10a–10c. After step (5d), as shown in FIGS. 11a–11c, the following steps are performed:

(5e) forming an intermediate electrolyte layer 335 on the etched reflective layer 120, as shown in FIG. 11a;

(5f) forming a second metal layer 320 on the intermediate electrolyte layer 335, as shown in FIG. 11b; and (5g) forming holes or vias 360 in the second metal layer 320 using photo-lithographic steps (5a) to (5d), as shown in FIG. 11c.

The vias 270, 360 of the two reflectors 120, 310 are offset relative to each other to increase reflectivity. Once the vias 360 are formed, steps (6)–(8), associated with FIG. 9b, are performed to complete the display. Of course, instead of using photolithographic steps to form the vias 270, 360, cracks may be formed in the two reflectors 120, 310 due to tensile stress, as described in connection with FIG. 9b.

The inventive display is thin, and image spreading and distortion does not occur. Such displays provide reflective high density flat panel paper-like electrochromic displays, for displaying high resolution color images having small pixels.

While the invention has been particularly shown and described with respect to illustrative and preformed embodiments thereof, it will be understood by those skilled in the art that the foregoing and other changes in form and details may be made therein without departing from the spirit and scope of the invention which should be linked only by the scope of the appended claims.

Having thus described our invention, what we claim as new, and desire to secure by letters patent is:

1. A method for forming a display comprising the steps of:
   (a) forming a counter electrode on a rear display;
   (b) forming a first layer of electrolyte on said counter electrode;
   (c) forming a reflector on said first layer of electrolyte;
   (d) forming a second layer of electrolyte, said second layer of electrolyte stressing said reflector to form voids therein; and
   (e) forming a front electrode on said second layer of electrolyte.

2. The method of claim 1, further comprising, after said step (e), the step of forming a diffuser over said front electrode.

3. The method of claim 1, further comprising, after said step (b), the step of dehydrating said first layer of electrolyte.

4. The method of claim 1, further comprising, after said step (d), the steps of:
   forming a second reflector over said second layer of electrolyte;
   forming voids in said second reflector, said second reflector voids being offset from said first reflector void; and
   forming a third layer of electrolytes over said second reflector.

5. The method of claim 1, further comprising, after said step (d), the steps of:
   forming a mask over said reflector;
   patterning said mask to expose portions of said reflector;
   etching said exposed portions of said reflectors to form holes therein; and
   removing said patterned mask.

6. The method of claim 1, further comprising, after said step (d), the step of etching holes through said reflector.

7. A display comprising:
   an electrode which is substantially transparent;
   a counter electrode spaced transversely and separated from said electrode by a predetermined distance;
   a reflector located between said electrode and counter electrode, said reflector being electrically isolated and ion permeable; and
   an electrolyte having ions and being interposed between said electrode and counter electrode,
   said predetermined distance being approximately between 50 microns to 100 microns to prevent image spreading from said counter electrode to said electrode.

8. A display comprising:

an electrode which is substantially transparent;

a counter electrode spaced transversely and separated from said electrode by a predetermined distance;

a reflector located between said electrode and counter electrode, said reflector being electrically isolated and being ion permeable due to one of cracks formed under tensile stress and holes etched therein; and an electrolyte having ions and being interposed between said electrode and counter electrode, said predetermined distance being selected to prevent image spreading from said counter electrode to said electrode.

9. A display comprising:

an electrode which is substantially transparent;

a counter electrode spaced transversely and separated from said electrode by a predetermined distance;

a reflector located between said electrode and counter electrode, said reflector being electrically isolated and ion permeable, and having a plurality of first voids for ion movement therethrough;

a second reflector having a plurality of second voids which are offset from said first voids to increase reflectivity, said second reflector being located between said electrode and counter electrode; and an electrolyte having ions and being interposed between said electrode and counter electrode, said predetermined distance being selected to prevent image spreading from said counter electrode to said electrode.

10. A display comprising:

an electrode which is substantially transparent;

a diffuser located over said electrode;

a counter electrode spaced transversely and separated from said electrode by a predetermined distance;

a reflector located between said electrode and counter electrode, said reflector being electrically isolated and ion permeable; and an electrolyte having ions and being interposed between said electrode and counter electrode, said predetermined distance being selected to prevent image spreading from said counter electrode to said electrode.

11. The display of claim 10, wherein said diffuser is a holographic diffuser which diffuses light incident thereon.

12. A display comprising:

an electrode which is substantially transparent;

a counter electrode spaced transversely and separated from said electrode by a Predetermined distance;

a reflector located between said electrode and counter electrode, said reflector being electrically isolated and ion permeable;

an electrolyte having ions and being interposed between said electrode and counter electrode; and inter-pixel isolation barriers interposed between said electrode and counter electrode, said barriers confining said electrolyte between said electrode and counter electrode, and said predetermined distance being selected to prevent image spreading from said counter electrode to said electrode.

* * * * *